Sept. 1, 1936.  H. L. PITMAN  2,053,107
TYPEWRITING MACHINE
Filed May 3, 1935
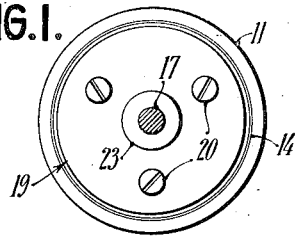
FIG.1.
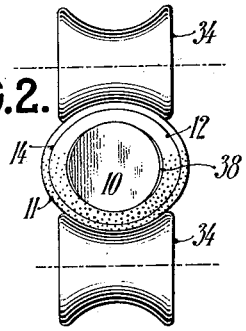
FIG.2.
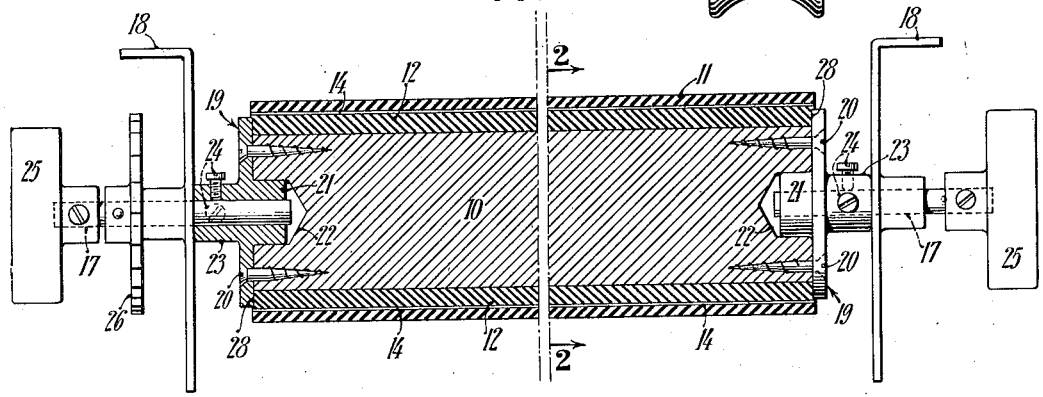
FIG.3.
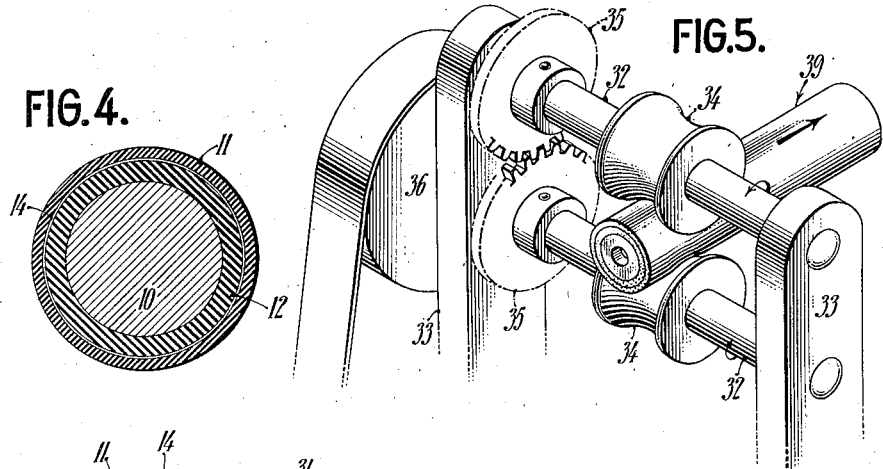
FIG.4.
FIG.5.
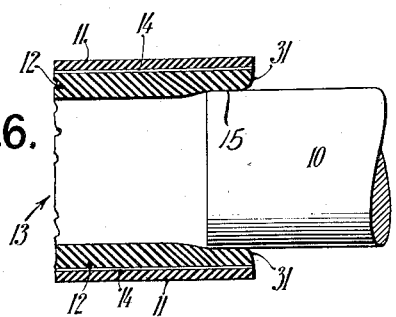
FIG.6.
INVENTOR:
Henry L Pitman
BY D C Stickney
ATTORNEY.

Patented Sept. 1, 1936

2,053,107

UNITED STATES PATENT OFFICE 2,053,107

TYPEWRITING MACHINE

Henry L. Pitman, Hartford, Conn., assignor to Underwood Elliott Fisher Company, New York, N. Y., a corporation of Delaware Application May 3, 1935, Serial No. 19,569

21 Claims. (Cl. 197—147)

This invention relates to cylindrical platens for typing machines, and affords a novel combination and arrangement of platen-unit elements, which I have discovered are efficacious (1) for very much diminishing the noise of type-impact on the platen; (2) for producing clear printing and manifolding; (3) for making the platen durable, particularly in that it retains its proper cylindrical shape and proper condition of its surface or periphery; and (4) for keeping the cost of producing the platen from outweighing the above and other advantages.

The problem presented, by merely changing the outer surface or jacket of the platen from the usual relatively hard vulcanized rubber, to a substance that is less hard, in order to diminish the noise of type-impact, is that immediately and as a direct result, the softer outer surface reduces the clearness of the printing and also reduces the number of distinct carbon copies that can be produced. The solution of this problem, namely, the provision of a platen construction wherein it is feasible to lessen the hardness of the outer surface of the platen, to conduce to a decrease in the noise of type-impact, without concomitantly and simultaneously lessening the clearness of printing and the number of distinct carbon copies, is one of the features of the present invention.

The invention provides for use of a suitable jacket composition which is substantially more inert to the propagation of sound vibrations than the ordinary hard-rubber surfaced platen. Such inertia, with its concomitant benefit of rendering the platen more quiet, is found in substances which are sluggishly elastic in that they have an appreciable time-lag of recovery from distortion, but which are therefore also softer than the ordinary hard-rubber surfaced platen as measured on a Shore durometer. An underlying layer of live rubber is compressed between the core and the jacket which is made of such substance, the compressed live rubber being thus under a permanent radial strain, which is found to be conducive to rendering the sluggishly elastic but softer platen-jacket equally or more efficacious for clear printing and the production of many distinct carbon copies, as compared with the ordinary hard-rubber surfaced noisy platen; and the compression of the intermediate live rubber layer also conduces to quietness of the platen. A layer of inextensible fabric is provided between the compressed live rubber layer and the jacket to resist the outward radial stress of said compressed live rubber layer, and thereby prevent distention of the jacket under said stress.

I employ in my platen a solid core of hard wood as the final anvil against which the types strike through the rubber platen-covering, the hard wood being used because it gives a much firmer resistance to the type-blows than soft wood and thereby, along with the other features of my platen, conduces to the making of many good carbon copies at one typing.

The hard wood platen-core is made solid particularly in that it has no opening passing therethrough, such as a central opening for a platen-axle. By avoiding such opening, there are avoided the hollow reverberating sounds noticeable with use of the ordinary hollow or tubular soft wood cores.

Thus there is discarded the usual steel platen-axle rod, which, in itself, is sonorous, and known to cause sounds, that are produced within the enclosure of the usual hollow platen-core, to be conducted to the ends of the axle-rod and emanate therefrom to the outside of the enclosure. It is well known that a music-box may be sealed tightly, and not give out any sound, but that, if a steel rod be inserted through the cover of the sealed box, the music can be heard very sonorously from the projecting body of the rod. Such a condition, with reference to a typewriter-platen, is avoided by means of my solid hard wood core, which does not have the usual platen-axle passing through it from end to end.

The core being solid and made of hard wood, such as hard maple which I have found satisfactory, keeps its shape, and therefore keeps the platen true and the printing perfect throughout a long life of the platen, even though the wood core is mounted only by its ends, as upon short gudgeons which may project outwardly from platen-end plates. The gudgeons carry the usual platen-knobs and are journaled in the usual platen-frame.

I use maple-wood which is thoroughly seasoned before being finished into the platen-core form. Forthwith upon being so finished, the core should be worked up into the complete platen so as to become encased by the rubber platen-covering, and the ends of the core completely sealed in by the platen-heads or end-plates. This conduces to preventing access of moisture to the wood, and thereby conduces to preventing warping of the platen.

The live rubber cushioning layer is in a radially squeezed or compressed state between the jacket and the solid hard wood core, and the latter aids in keeping said cushioning layer radially under a permanent, live elastic strain which conduces to making the platen quiet and to clear printing and good manifolding. The radial strain of the compressed live rubber layer upon the solid hard wood core also tends to damp sound vibrations in the latter.

The frictional drag upon the rubber covering incident to forcing the platen-parts together endwise to gain the radial compression of the live rubber layer may unequally deform or bias the soft or live rubber sleeve and also the wearing jacket, and correspondingly set up strains. These strains would tend to induce ultimately distortion of the subsequently finished platen-surface. It is a feature of the invention, therefore, to put the cured platen through a kneading process to remove or neutralize any such undesired deformation and strains. This follows the assembly of the jacket, core and the intervening compressed live rubber layer.

This deformation-removing kneading process may be economically and efficiently accomplished by passing the platen repeatedly lengthwise through a kneading-roller mechanism to knead substantially the entire platen-periphery, so that there remains substantially only the desired radial and uniform compression of the live rubber layer and proper companion condition of the jacket.

In order to conduce to the sound-deadening property of the platen, I make the hard jacket sufficiently elastic, but it is noticeably very sluggish in its recovery from distortion. The jacket is hard enough to conduce to clear printing and manifolding, and has long life without permanent indentation or impairment of its printing surface. If, for example, a slight indentation is made in the jacket, as by forcibly pressing the point of a pencil thereagainst, the indentation would fill up slowly; the recovery of the jacket-surface becoming complete in say a minute. This elastic time lag property, illustrated by said slow but complete recovery, conduces to the absorption of sound-vibrations. The hardness of the outer jacket I find satisfactory at about 90 as measured by a Shore durometer. The live rubber cushioning layer which is composed of almost pure rubber is satisfactory at a hardness of about 50 on the Shore durometer.

Other features and advantages will hereinafter appear.

In the accompanying drawing,

Figure 1 is an end view of the platen.

Figure 2 is an end view of the platen, and indicates the action thereupon of the kneading rollers.

Figure 3 is a front elevation view showing the novel platen journaled in its supports, the platen itself being shown in longitudinal section to bring out details. To contract the view the middle segment of the platen is represented by the space between the two indicated dot-and-dash lines, it being understood that said middle segment is solid in structure like the part immediately adjacent to either side of said lines.

Figure 4 is a cross-section view of the solidly cored platen.

Figure 5 is a perspective view illustrating a kneading-roller mechanism and the platen passing therethrough.

Figure 6 is a fragmentary view of the platen-core and its covering, to illustrate radial compression of the inner cushioning layer of the covering by forcing the core into it, the covering being shown in longitudinal section.

The drawing represents my improved platen, which comprises a hard wood core 10, an outer facing or jacket 11 of comparatively hard rubber, and, between said outer jacket and the core, a cushioning layer 12 of live soft rubber.

As seen in Figure 3, the core 10 is made solid throughout its diameter and between its end-portions, so that it may afford no hollow in which sound reverberations may occur; nor does the core therefore have any platen-axle rod extending therethrough by which sound can emanate from the platen.

Hard maple is preferably used for the hard wood core, and should be thoroughly seasoned before the core is finished.

The two plies of rubber, namely, the outer hard jacket 11 and the inner layer 12 of live rubber may be combined into a single tube 13, Figure 6, as by cementing or by vulcanizing the plies jointly, together with an intermediate thin layer of inextensible fabric 14, such as cloth.

The diameter of the bore of the tube 13 is initially smaller than the outer diameter of the hard wood core 10, so that the soft rubber layer 12, upon insertion of the core 10 thereinto, is caused to be compressed radially as indicated at 15, Figure 6. With the core 10 in place within the tube, as in Figure 3, said inner cushioning layer 12 is, by reason of such compression, permanently under live elastic radial strain, which conduces to the quietness and good printing and manifolding properties of the solidly cored platen. In other words, the compression of the soft rubber layer 12 on the core 10 is effected by having the difference between the internal radius or semi-diameter of the jacket and the external radius or semi-diameter of the core less than a certain initial thickness of said soft rubber layer.

It may be noted that, besides demarcating the outer jacket 11 and the live rubber layer 12, the intermediate inextensible fabric 14 helps the hard outer jacket 11 to resist distension, and thereby conduces to keeping the cushioning layer 12 permanently under the live elastic radial strain.

In lieu of the discarded usual axle-rod, the solidly cored platen may have at its opposite ends gudgeons or stub-shafts 17, by means of which it is journaled in the usual platen-frame members 18. The stub-shafts 17 may be detachably connected to the ends of the platen by means of end-plates 19, secured facewise to the end-faces of the solid hard wood core 10 by screws 20. Each end-plate 19 may have a hub 21 having a push fit into a shallow pit or recess 22 in the end-face of the core 10 to securely keep said plate and the stub-shaft concentric with the platen-axis independently of the screws 20. Each end-plate 19 may also have an outer hub 23 into which are threaded set-screws 24 for removably securing the stub-shaft in the indicated bore of the plate.

It will be understood that, by reason of their shallowness in depth, the end-plate-centralizing pits or recesses 22 at the ends of the core 10 in no wise impair the effects of solidity of the hard wood platen-core at which I aim, because their depth is substantially the same or less than the width of the end track of the platen-surface not contacted or struck by type in using the typewriter, so that there is no hollow or opening in any diameter beneath any type-impact.

The stub-shafts 17 carry the usual platen-knobs 25, and one of the shafts has fastened thereto the usual line-space wheel 26. Preparatory to removing or replacing the platen, the stub-shafts can be withdrawn from the end-plates 19 upon loosening the set-screws 24.

The cushioning layer of live rubber may extend slightly beyond each end-face of the hard wood core 10, before the end-plates 19 are put on. Thus, upon securing the end-plates to the core-end faces, by the screws 20, the ends of the live rubber layer 12 will be slightly compressed, and will conversely press permanently against the end-plates, as indicated at 28, Figure 3, to form a seal against access of moisture to the hard wood core, upon which, to further guard against access of moisture, the rubber covering has been placed forthwith upon finishing the core.

The wear-resisting outer jacket 11 may have a hardness of about 90, and, as hereinbefore mentioned, may have a definite and appreciable time-lag or slow rate of elastic recovery from distortion; and the inner layer 12 of live cushioning rubber may have a hardness of 50. These hardness indexes are as measured on a Shore durometer on which the wear-resisting jacket of the usual or average ordinary platen is found to measure about 98, it being understood that there is no resiliency, and, correspondingly, little impact-noise-minimizing property in vulcanized rubber which measures 100 on the durometer.

The elastic radial strain under which the live rubber layer 12 is permanently maintained conduces to the feasibility of making, for sound-deadening purposes, the outer jacket less hard than was heretofore deemed necessary to effect sharp, clear printing, and good manifolding, because the effect of said strain is to compensate for the reduced jacket hardness, in order to give clear printing and good manifolding.

It will be seen from an inspection of Figure 3 that my platen-structure is such that the cost of producing same does not outweigh its advantages, and that, in fact, the cost would be little, if any, more than that of producing the ordinary platen.

The diametric dimensions of the platen-elements are preferably made in the proportions indicated by the drawing. For example, for a platen having an over-all diameter of 1¾ inches, the outer jacket 11 may be say 7/64 of an inch thick, the inner live rubber layer 12 may be say 11/64 of an inch thick in its compressed state, and the diameter of the solid hard maple wood core 13/16 of an inch. A satisfactory degree of compression of the live rubber cushioning layer 12 will result from making the diameter of the initial bore of said layer 12 about .040 of an inch smaller than the diameter of the hard wood core 10, with reference to the above proportions, the initial thickness of said layer 12, before compression, being therefore about 0.129 of an inch. It will be understood, however, that, within the scope of the invention, the above proportions may be varied.

The frictional drag to which the live rubber layer 12 and the jacket 11 are subjected by reason of forcing the parts together endwise as in Figure 6, may cause a biasing deformation of the jacket 11 and live rubber layer 12, such biasing deformation being diagrammatically indicated by the slope at the end 31, Figure 6, of the rubber covering. Such biasing and other undesired deformation may occur in some degree and unequally throughout the rubber covering 11, 12, and put the covering under corresponding strains which would cause ultimate distortion of the platen-surface if not removed before the latter is finished.

For removing the undesired deformation and its accompanying strains which create a tendency in the compressed, confined rubber to grow misshapen, the platen is kneaded before its surface is ground or otherwise finished to make it true, and the kneading may be accomplished effectively by passing the platen endwise through a kneading-roll mechanism, one form of which is represented in Figure 5. In said kneading mechanism, opposite shafts 32, journaled in a support represented by standards 33, each carry a roller 34 having a concave contour corresponding substantially with the cylindrical platen-surface.

The rollers are keyed to said shafts 32, and the latter may be connected by gears 35, so that a power-operated pulley 36 upon one of the shafts drives the shafts and the rollers in unison. With the shafts and their rollers rotating, the platen, which is to be kneaded, is inserted endwise between the rollers which are arranged to squeeze, and thus knead the platen as the latter passes between the rollers, as indicated in Figure 5, in which 39 represents the platen. In the indicated kneading mechanism, only one pair of rollers is shown, although it will be obvious that there may be several pairs of rollers in series, arranged so that the platen, in one passage through the several pairs of rollers, is subjected to kneading substantially throughout its circumference. In the indicated mechanism, which shows only one pair of rollers, kneading of the platen substantially throughout its circumference may be effected by passing the platen repeatedly between the rollers, say four times, the platen being partly turned each time so as to subject a different part of its circumference to the kneading action of the rollers.

Figure 2 represents the kneading action of the rollers, as producing a strain-removing effect similar to that indicated at 38, where the live rubber layer is shown momentarily squeezed slightly away from the core 10, and is thus enabled to recover from the biasing deformation. Following the kneading operation, the platen-surface may be trued as by grinding.

Variations may be resorted to within the scope of the invention, and portions of the improvements may be used without others.

Having thus described my invention, I claim:

1. A platen-cylinder designed for quiet type-impact, clear printing, and durability, including, in combination, a solid core of hard wood, the hard wood being solid in any diameter substantially throughout the length of the core, a wear-resisting jacket of hard rubber having an appreciable time-lag of recovery from distortion, and a layer of live soft rubber which is compressed by and between said hard rubber jacket and the solid hard wood core, so as to be permanently under live elastic radial strain, means being provided at the opposite ends of the solidly cored platen for journaling same in a support.

2. A platen-cylinder designed for quiet type-impact, clear printing, and durability, including, in combination, a solid core of hard wood, the hard wood being solid in any diameter substantially throughout the length of the core, a wear-resisting jacket of hard rubber having an appreciable time-lag of recovery, a layer of live soft rubber which is compressed by and between said hard rubber jacket and the solid hard wood core, so as to be permanently under live elastic radial strain, and end-plates secured to the opposite end-faces of the solid hard wood core, and arranged to present platen-journaling stub-shafts, each end-plate and the companion core plate and stub-shaft concentric with the platen-axis.

3. A platen-cylinder for receiving movable type-bar impacts, including, in combination, a wear-resisting jacket of hard rubber having less hardness than that of the usual jacket, said jacket having a composition and softness that render it inert to the propagation of sound vibrations, the inertness being manifested by an appreciable time-lag in recovery of the jacket from distortion, and an underlying layer of soft rubber which is compressed to have a permanent live radial strain, the degree of lessening of the hardness of the outer jacket being substantially counterbalanced by the live radial strain afforded by the compression of said underlying layer.

4. In a platen-cylinder, the combination of a hard, smooth core-element, a wear-resisting jacket of hard rubber which has an appreciable time-lag of recovery from distortion, and a layer of live soft rubber which is caused to be compressed, from an initially greater thickness, by and between said hard rubber jacket and the core-element, so as to be permanently under live elastic radial strain.

5. In a platen-cylinder, the combination of a hard, smooth core-element, a wear-resisting outer jacket of hard rubber which has an appreciable time-lag of recovery from distortion, a layer of live soft rubber which is caused to be compressed, from an initially greater thickness, by and between said hard rubber jacket and the core-element, so as to be permanently under live elastic radial strain, and a thin sleeve of inextensible fabric between said jacket and live rubber layer, said fabric-sleeve acting to aid said jacket in keeping the compressed live rubber layer from expanding and losing its compression.

6. A platen-cylinder having a core-element, a wear-resisting outer jacket of a composition which is inert to the propagation of noise vibrations, said composition therefore having an appreciable time-lag of recovery from distortion, and a layer of live soft rubber which is caused to be compressed, from an initially greater thickness, by and between said outer jacket and core-element, so as to be permanently under a live elastic radial strain.

7. A platen-cylinder having a core-element, a wear-resisting outer jacket of a composition which is inert to the propagation of noise vibrations, said composition therefore having an appreciable time-lag of recovery from distortion, and a layer of live soft rubber which is caused to be compressed, from an initially greater thickness, by and between said outer jacket and core-element, so as to be permanently under a live elastic radial strain, said compression being effected by having the difference between the internal radius of said jacket and the external radius of said core less than a certain initial thickness of said live rubber layer.

8. A platen-cylinder having a core-element, a wear-resisting outer jacket of hard rubber but appreciably softer than the hard rubber surface of the usual harder platen, and a layer of live soft rubber which is caused to be compressed, from an initially greater thickness, by and between said outer jacket and core-element, so as to be permanently under a live elastic radial strain, said hard rubber jacket having a hardness index of about 90 as compared with an index of about 98 on certain harder platens, said softer jacket rendering said platen-cylinder more quiet, and the compressed live rubber layer acting as a compensator coacting with said softer jacket, to cause substantially the same or better printing and manifolding properties as obtained with said harder platens.

9. A platen-cylinder for receiving movable type-bar impacts, including, in combination, a wear-resisting jacket of hard rubber having less hardness than that of the usual jacket, said jacket having a composition and softness that render it inert to the propagation of sound vibrations, the inertness being manifested by an appreciable time-lag in recovery of the jacket from distortion, and an underlying layer of soft rubber which is compressed to have a permanent live radial strain, the degree of softening of the outer jacket being complementary to the degree of compression of the underlying layer, whereby type-impact noise on the surface of the platen is reduced without impairing the imprinting or manifolding property of the platen.

10. In a typing-machine platen, the combination of a rubber covering, a solid cylinder of hard wood, such as hard maple, as the final anvil against which the types strike through said covering, said hard wood cylinder being solid, and therefore devoid of any hollow or opening, in any diameter throughout the type-impact-receiving length, and the hard wood conducing to maintaining the platen true and to quietness of the platen, and end-plates secured to the opposite end-faces of said hard wood anvil, each end-face having a shallow pit fitting a companion hub, provided on each plate, to centralize the latter, each plate also having an external hub, each plate and its hubs being bored to receive a platen-journaling stub-shaft, said rubber covering including an outer wear-resisting jacket of hard rubber but appreciably softer than the usual platen-surface, and a layer of live soft rubber, which is caused to be compressed by and between said jacket and the hard wood anvil, so as to be permanently under a live elastic radial strain to compensate for the softer jacket.

11. In a typing-machine platen, the combination of a rubber covering, a solid cylinder of hard wood, such as hard maple, as the final anvil against which the types strike through said covering, said hard wood cylinder being solid, and therefore devoid of any hollow or opening in any diameter throughout the type-impact-receiving length, and the hard wood conducing to maintaining the platen true and to quietness of the platen, and end-plates secured to the opposite end-faces of said hard wood anvil, each end-face having a shallow pit fitting a companion hub, provided on each plate, to centralize the latter, each plate also having an external hub, each plate and its hubs being bored to receive a platen-journaling stub-shaft, said rubber covering comprising an outer wear-resisting jacket of hard rubber but appreciably softer than the usual platen-surface, a layer of live soft rubber, which is caused to be compressed by and between said jacket and the hard wood anvil, so as to be permanently under a live elastic radial strain to compensate for the softer jacket, and a thin sleeve of inelastic fabric between said jacket and live rubber layer, said fabric-sleeve acting to aid said outer jacket in keeping the compressed live rubber layer from expanding and losing its compression.

12. In a typing-machine platen, the combination of a rubber covering, a solid cylinder of hard end-face having interlocking portions to keep the wood, such as hard maple, as the final anvil against which the types strike through said covering, said hard wood cylinder being solid, and therefore devoid of any hollow or opening in any diameter, throughout the type-impact-receiving length, and the hard wood conducing to maintaining the platen true and to quietness of the platen, and end-plates secured to the opposite end-faces of said hard wood anvil, each end-face having a shallow pit fitting a companion hub, provided on each plate, to centralize the latter, each plate also having an external hub, each plate and its hubs being bored to receive a platen-journaling stub-shaft, said rubber covering comprising an outer wear-resisting jacket of hard rubber, a layer of live soft rubber, which is caused to be compressed by and between said jacket and the hard wood anvil, so as to be permanently under a live elastic radial strain, and a thin sleeve of inelastic fabric between said jacket and live rubber layer, said fabric-sleeve acting to aid said outer jacket in keeping the compressed live rubber layer from expanding and losing its compression, said hard rubber jacket having a hardness index of about 90 as compared with an index of about 98 on certain harder platens, said softer jacket rendering said platen more quiet, and the compressed live rubber layer acting as a compensator coacting with said softer jacket and the solid hard wood anvil to cause substantially the same or better printing and manifolding properties as obtained with said harder platens.

13. The method of preparing a cylindrical platen for a typewriting machine, by forcing a soft rubber tube having a small bore permanently upon an oversize mandrel forming a permanent core, to compress the rubber while the latter is permanently confined against expansion, and then exerting pressure on the surface of the platen at a plurality of points to reduce or overcome any misshapen condition in the compressed confined rubber.

14. The method of preparing a cylindrical platen for a typewriting machine, by forcing a soft rubber tube having a small bore permanently upon an oversize mandrel forming a permanent core, to compress the rubber while the latter is permanently confined against expansion, and then kneading the platen to equalize the radial strains in the compressed confined rubber.

15. The method of preparing a cylindrical platen for a typewriting machine, by forcing a soft rubber tube having a small bore permanently upon an oversize mandrel forming a permanent core, to compress the rubber while the latter is permanently confined against expansion, and then kneading the platen to equalize the radial strains and to eliminate all other strains in the compressed confined rubber.

16. The method of preparing a cylindrical platen for a typewriting machine, by forcing a soft rubber tube having a small bore permanently upon an oversize mandrel forming a permanent core, to compress the rubber while the latter is permanently confined against expansion, and then exerting pressure upon different segments of the platen-surface to equalize the radial strains and to eliminate all other strains in the compressed confined rubber.

17. The method of preparing a cylindrical platen for a typewriting machine, by forcing a soft rubber tube having a small bore permanently upon an oversize mandrel forming a permanent core, to compress the rubber while the latter is permanently confined against expansion, and then subjecting said platen to a rolling operation, thereby to knead the platen to reduce or overcome any misshapen condition in the compressed confined rubber.

18. The method of preparing a cylindrical platen for a typewriting machine, by forcing a soft rubber tube having a small bore permanently upon an oversize mandrel forming a permanent core, to compress the rubber while the latter is permanently confined against expansion, and then kneading the platen to reduce or overcome any misshapen condition in the compressed confined rubber.

19. A typewriter-platen having a solid cylindrical wooden core which has axial gudgeons at either end, a soft rubber tubular body having a bore initially of less diameter than said core and permanently stretched over said core, an inextensible fabric wrapping being provided around said soft rubber tube to hold said rubber tube under permanent compression, said compression being caused by the stretching of said tube over said core, and a wear-resisting jacket over said wrapping.

20. A platen-cylinder for receiving movable type-bar impacts, including, in combination, a wear-resisting jacket of hard rubber having less hardness than that of the usual jacket, said jacket having a composition and softness that render it inert to the propagation of sound vibrations, the inertness being manifested by an appreciable time-lag in recovery of the jacket from distortion, and an underlying layer of soft rubber which is compressed to have a permanent live radial strain, the degree of softening of the outer jacket and the degree of time-lag in recovery from distortion of said jacket being complementary to the degree of compression of said underlying layer, whereby the noises of type-impact on the platen are reduced without impairing the imprinting or manifolding properties of the platen.

21. A platen-cylinder having a core-element, a wear-resisting outer jacket of hard rubber but appreciably softer than the hard-rubber surface of the usual harder platen, and a layer of live soft rubber which is caused to be compressed to approximately four-fifths of its initial greater thickness, by and between said outer jacket and core-element, so as to be permanently under a live elastic radial strain, said hard rubber jacket having a hardness of about 90 on the Shore durometer as compared with an outer jacket hardness of about 98 on the usual hard rubber platens, said softer jacket rendering said platen-cylinder more quiet, and the compressed live rubber layer acting as a compensator coacting with said softer outer jacket, to cause substantially the same or better printing and manifolding properties as obtain with said usual harder platens.

HENRY L. PITMAN.